United States Patent [19]
Namai et al.

[11] Patent Number: 4,653,892
[45] Date of Patent: Mar. 31, 1987

[54] LENS BARREL DRIVING APPARATUS IN CAMERA

[75] Inventors: Akihiro Namai, Kanagawa; Akira Egawa; Takanori Kodaira, both of Tokyo, all of Japan

[73] Assignee: Canon Kabushiki Kaisha, Japan

[21] Appl. No.: 857,522

[22] Filed: Apr. 23, 1986

Related U.S. Application Data

[63] Continuation of Ser. No. 759,114, Jul. 25, 1985, abandoned.

[30] Foreign Application Priority Data

Jul. 30, 1984 [JP] Japan ................................ 59-160090

[51] Int. Cl.4 ........................... G03B 3/10; G03B 9/08
[52] U.S. Cl. .................................... 354/400; 354/234.1
[58] Field of Search ................................ 354/400–405, 354/195.1, 234.1, 235.1

[56] References Cited

U.S. PATENT DOCUMENTS 4,021,821 5/1977 Peterson ............................. 354/405
4,396,267 8/1983 Hirohata et al. ................... 354/400
4,401,378 8/1983 Hirohata et al. ............. 354/195.1 X
4,423,941 1/1984 Iwata et al. ..................... 354/195.1
4,505,566 3/1985 Noguchi ............................. 354/400
4,505,567 3/1985 Hirohata et al. ................ 354/195.1
4,508,422 4/1985 Hirohata ........................... 354/400

Primary Examiner—William B. Perkey
Attorney, Agent, or Firm—Toren, McGeady and Goldberg

[57] ABSTRACT

An apparatus for axially moving a photographic lens barrel in a camera by a corresponding number of steps to the number of driving pulses supplied to a rocking coil in a magnetic field, as motion of the coil is transmitted through a ratchet mechanism with a cam to the barrel. In synchronism with the falling edge of each driving pulse at which the ratchet mechanism starts to return to its initial position by the bias force of a spring, a negative going pulse of shorter duration than that of the driving pulse is applied to the coil to speed up the setting of the barrel.

9 Claims, 9 Drawing Figures

FIG.7
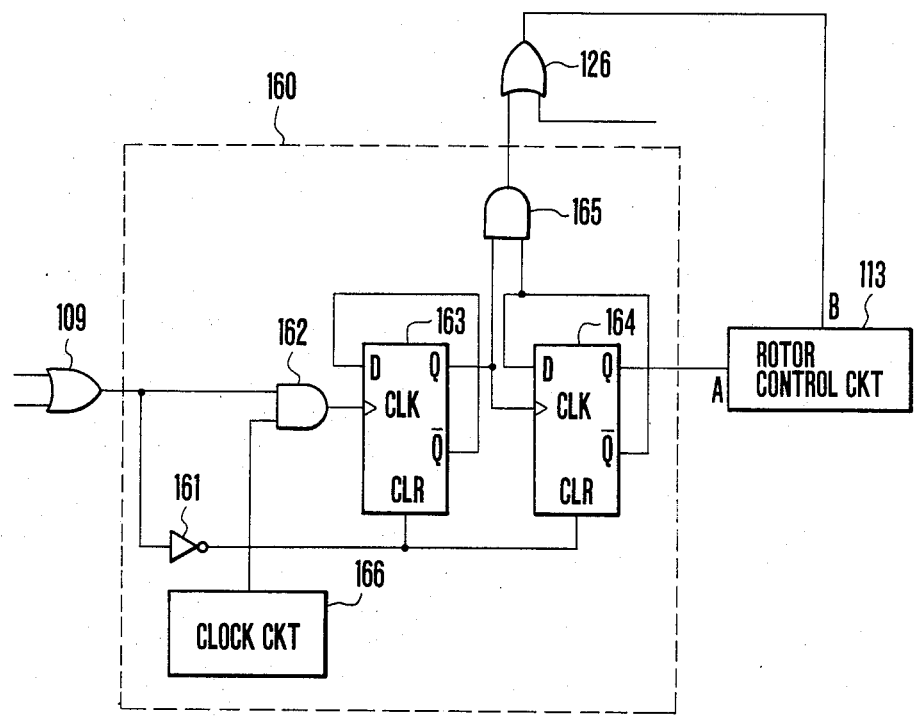
FIG.8A  NORMAL DIRECTION
FIG.8B
↓ REVERSE DIRECTION

LENS BARREL DRIVING APPARATUS IN CAMERA

This is a continuation, of application Ser. No. 759,114, filed July 25, 1985, now abandoned.

BACKGROUND OF THE INVENTION

1. Field of the Invention

This invention relates to auto-focus cameras, and more particularly to an apparatus for controlling the stepwise focusing movement of a lens barrel.

2. Description of the Prior Art

In the conventional camera's lens barrel driving apparatus for controlling the stepwise focusing movement of the photographic lens, a rotor having a moving coil printed thereon is arranged in a magnetic field and a current supply of prescribed direction (hereinafter called a "normal" current supply) to the coil is recycled to axially move the photographic lens stepwise. In more detail, for one pulse of normal current supply to the coil, the rotor rocks in one direction, driving a ratchet of the barrel to advance one tooth. As the pulse then fades, the rotor and the ratchet mechanism are brought back to their initial positions by a common return spring. Such a procedure is repeated a number of times depending on the object distance until the photographic lens is focused on the object.

Since the driving torque of the rotor is limited by the capacity of the electrical source or battery, because, in such a conventional apparatus, not only the mass of the lens barrel but also the bias force of the return spring is loaded on the rotor, a much-desired increase in the working speed of the rotor could not be achieved. Also since the time necessary to reset the rotor and the ratchet mechanism to the initial position depends on the magnitude of the driving force of the aforesaid return spring, there was automatically determined a limit on the shortening of the time necessary to advance the ratchet by one tooth and then to reset it to the initial position, or the period of one cycle of operation.

From such reasons, the prior known apparatus of this kind had a problem that the focusing of the photographic lens barrel takes so long a time that as the time lag from the actuation of a camera release to the start of a shutter operation is long, when shooting a moving object, the image in the frame of film is caused to differ from the finder image. The shorter the shooting time lag, the easier the management of the camera can be said to be. In this respect, there has been a demand for speeding up the focusing of the photographic lens.

SUMMARY OF THE INVENTION

An object of the present invention is to eliminate the above-described problem, and to provide a lens barrel driving apparatus for a camera in which when the rotor is reset to the initial position, a pulse of current of reversed direction to that of current when the ratchet is advanced is supplied to the coil on the rotor, whereby the returning speed of the rotor is increased to shorten the time of focusing the lens barrel.

This and other objects will become apparent from the following description of an embodiment thereof.

BRIEF DESCRIPTION OF THE DRAWINGS

FIG. 7 is an electrical circuit diagram illustrating the pulse generating circuit of FIG. 3 and another example of the one-shot circuit.

FIGS. 8A and 8B are wave forms of current to the rotor.

DETAILED DESCRIPTION OF THE PREFERRED EMBODIMENT

The present invention will next be described in connection with an embodiment thereof by reference to the drawings.

Figure 2:
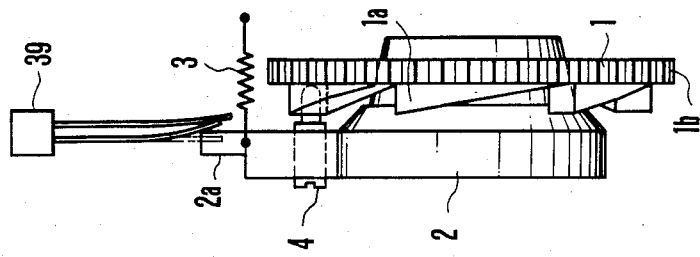
FIG. 2 is a side elevational view of the lens barrel and the ratchet of FIG. 1.
Figure 1:
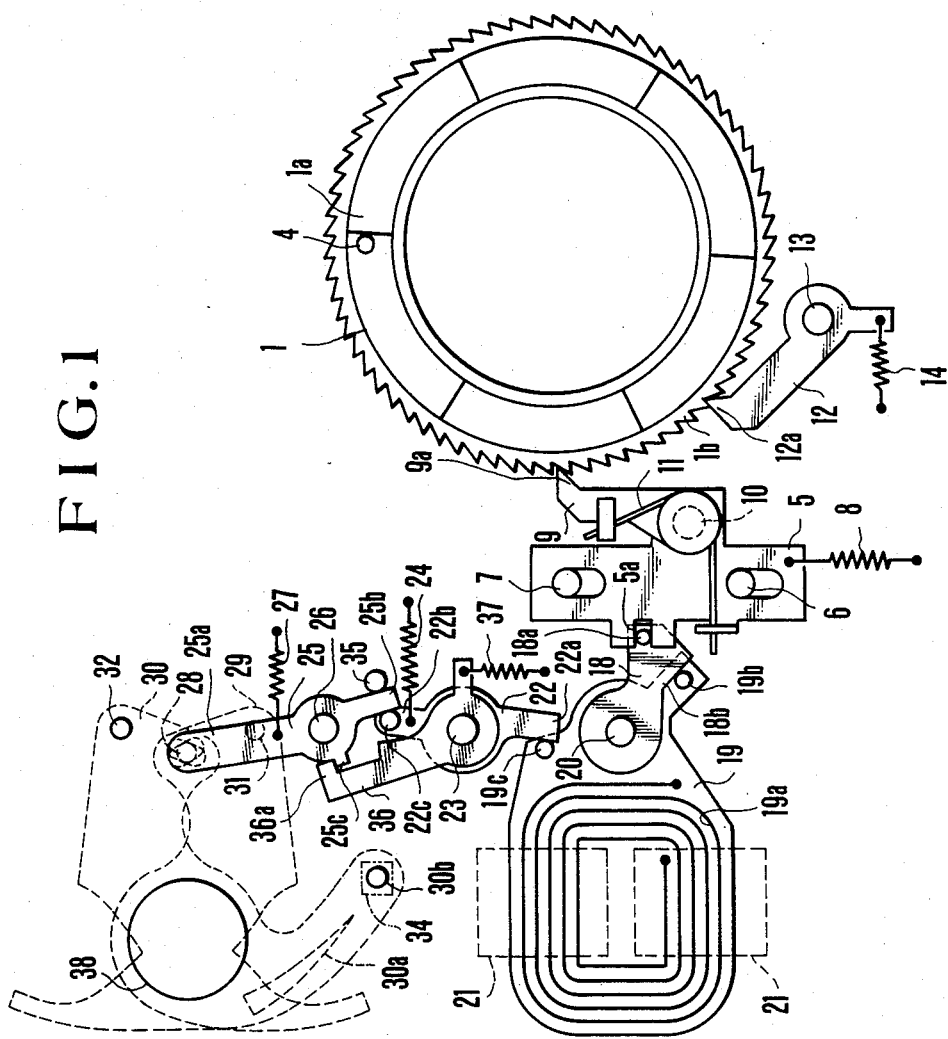
FIG. 1 is a front elevational view of an embodiment of a lens barrel driving apparatus in a camera according to the present invention.

Referring to FIGS. 1 and 2, the apparatus for driving a photographic lens barrel 2 includes a distance adjusting ring 1 having six arcuate cam lobes 1a in a common circle on the front surface thereof and having a ratchet wheel 1b formed in the outer periphery thereof. The ring 1 is rotatably arranged, while being restrained from axial movement. The barrel 2 is arranged axially movably relative to the ring 1, and is urged by a spring 3 rearward so that a cam follower pin 4 extending rearwardly of the barrel 2 abuts on one of the cam lobes 1a. When the ring 1 turns in a clockwise direction as viewed in FIG. 1, therefore, the barrel 2 is moved axially forward by a distance depending on the amount of rotation of the ring 1. The pin 4 also serves to adjust the barrel 2 to a setting at infinity.

A reciprocating slide plate 5 has two longitudinal slots in which are engaged respective pins 6 and 7 fixedly secured to a base plate (not shown), and is urged by a spring 8 downward as viewed in FIG. 1. A ratchet 9 is pivotally mounted on a pin 10 of the slide plate 5, and is biased by a spring 11 to a clockwise direction so that its nose 9a engages with one of the teeth of the ratchet wheel 1b. Therefore, for every one cycle of up-and-down movement of the slide plate 5, the ring 1 rotates one tooth, which is transmitted to axially move the barrel 2 one step.

A pawl 12 is pivotally mounted on a pin 13 secured to the base plate and is biased by a spring 14 in a clockwise direction so that its nose 12a engages with one of the ratchet teeth to hold the ring 1 in the advanced position when the reciprocating slide plate 5 returns back, since the bias force of the spring 3 is transmitted through the pin 4-and-cam 1a connection to turn the ring 1 in a counterclockwise direction.

A drive lever 18 and a rotor 19 are pivotally mounted on a common shaft 20 which is fixedly secured to the base plate. A pin 18a on the lever 18 extends into a recess 5a of the reciprocating slide plate 5 so that counterclockwise movement of the lever 18 is transmitted to upward movement of the plate 5 against the bias force of the return spring 8.

The rotor 19 has a printed coil 19a and is arranged in a magnetic field between permanent magnet pieces 21 so that when the coil 19a is supplied with current flowing in a normal direction, a magnetomotive force is exerted. Reacting to it, the rotor 19 rocks in a counterclockwise direction from an illustrated or initial position. As a pin 19b on the rotor 19 bears the lever 18 at one side edge thereof, such movement of rotor 19 causes counterclockwise movement of the lever 18. As soon as the slide plate 5 reaches the uppermost position, the printed coil 19a is then supplied with current flowing in the reversed direction to drive the rotor 19 to rock back in the clockwise direction at a faster speed than that of backward movement of the lever 18 and slide plate 5 which is driven by the spring 8.

If it is from the initial position that a clockwise movement of the rotor 19 takes place as the printed coil 19a is supplied with current of the reversed direction, a shutter is released.

An operating mechanism for the shutter includes a drive lever 22 pivotally mounted on a pin 23 which is fixedly secured to the base plate. A spring 24 urges the lever 22 in a clockwise direction, so that its one arm 22a abuts on a pin 19c of the rotor 19, by which clockwise movement of rotor 19 is transmitted to counterclockwise movement of the lever 22 against the bias force of a spring 24.

A lever 25 for controlling the opening and closing operation of blades 29 and 30 has two arms 25a and 25b and is pivotally mounted on a pin 26 fixedly mounted on the base plate. A spring 27 urges the lever 25 in a clockwise direction. A drive connection pin 28 on the end of one arm 25a extends into both slots in the shutter blades 29 and 30 so that when the lever 25 turns in the clockwise direction, the blades 29 and 30 are turned about pivot pins 31 and 32 on the base plate respectively to open an exposure aperture 38 formed in the base plate. A photoelectric transducer element 34 of a light meter is positioned to receive light through a square opening 30b having a function of producing a low brightness warning signal when in the illustrated or initial position, and through an auxiliary aperture opening 30a when the shutter is opening.

The other arm 25b abuts against a pin 22c fixedly mounted to an arm 22b of the drive lever 22. But, because the spring 24 is stronger than the spring 27, the blades 29 and 30 are held in the illustrated or closing position.

A stopper pin 35 limits the counterclockwisemost position of the blade control lever 25 where the shutter is closed. A latch lever 36 is pivotally mounted on the common shaft 23 of the drive lever 22 and is urged by a spring 37 in a clockwise direction so that its pawl 36a comes to engage on an extension 25c soon after the pin 22c moves away from the lever tail 25b.

It should be noted that the aforesaid exposure aperture 38 is actually in axial alignment with the lens barrel 2, though not so shown here for the purpose of a better understanding of the mechanisms.

In FIG. 2, a lens stop switch 39 is arranged adjacent a radial projection 2a of the barrel 2 to turn off when the barrel 2 axially moves a slight distance forward, and to turn on when each cam lobe 1a moves away from the follower 4.

Figure 3:
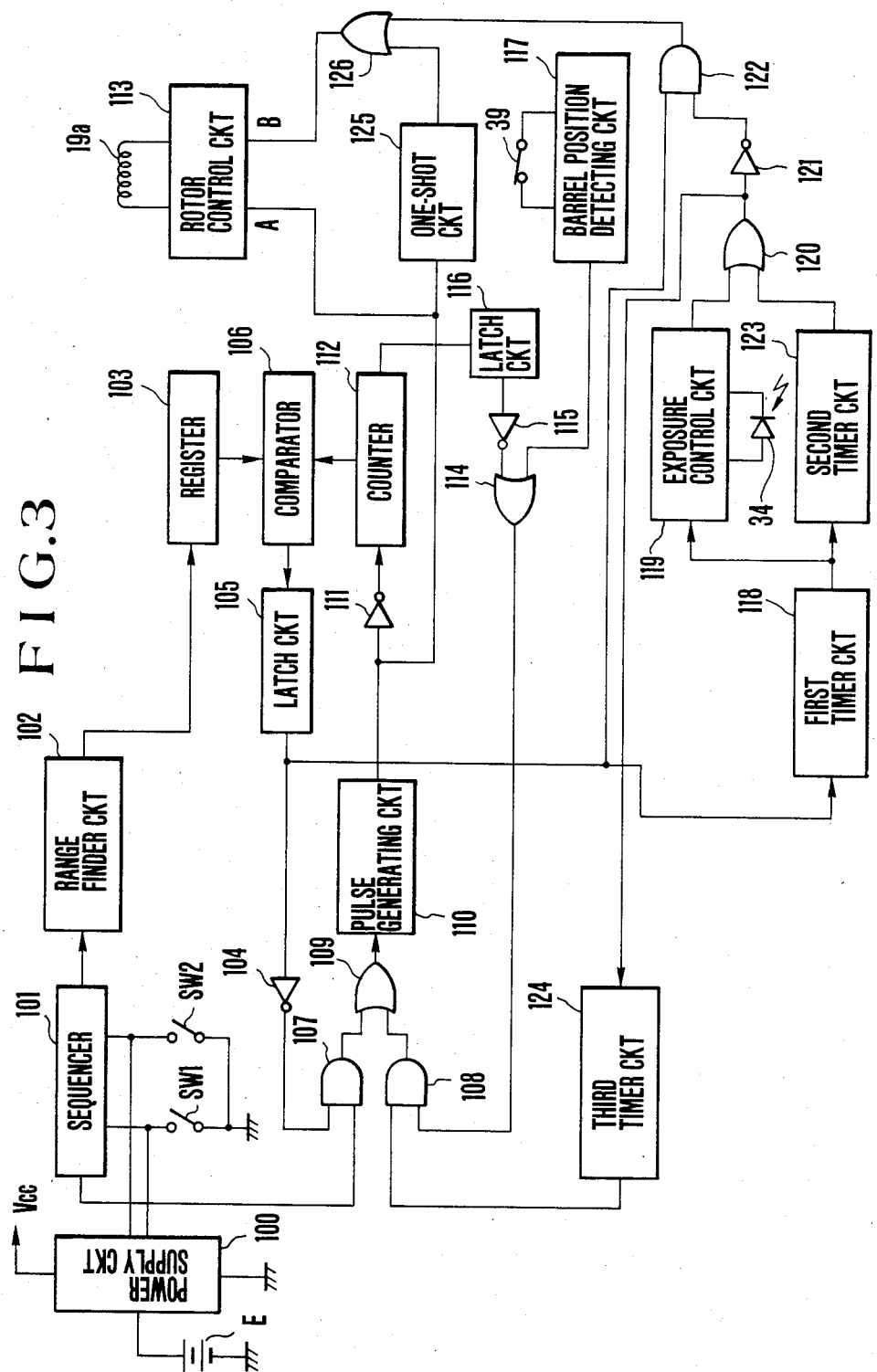
FIG. 3 is an electrical circuit diagram, partly in block form, of the camera having the apparatus of FIG. 1.

FIG. 3 illustrates a control circuit usable with the apparatus of FIGS. 1 and 2. The circuit includes an electrical power source or battery E, a power supply circuit 100, a sequencer for controlling the operations of the camera, a switch SW1 arranged to turn on when a release button is pushed to a first stroke, a second switch SW2 arranged to turn on when the button is further pushed to the second stroke, a range finder circuit 102 of known construction, a register 103 for memorizing the object distance determined by the range finder circuit 102, an inverter 104, a latch circuit 105, a comparator 106, AND gates 107 and 108, an OR gate 109, and a pulse generator 110, whose output is applied through an inverter 111 to a counter 112. The output of the counter 112 is compared with the output of the register 103 by the comparator 106. The output of this comparator 106 is applied through the latch circuit 105 and the interver 104 to the AND gate 107 at its one input, the other input of which is connected to the output of the sequencer 101. The output of the AND gate 107 is applied through the OR gate 109 to the pulse generating circuit 110.

Figure 4:
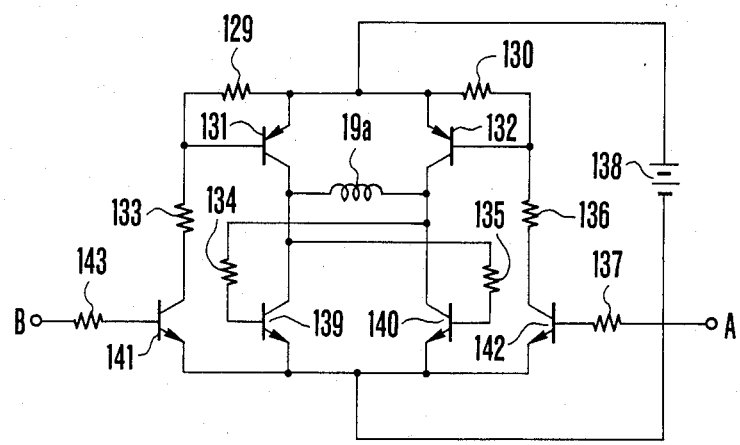
FIG. 4 is an electrical circuit diagram illustrating the details of the rotor control circuit of FIG. 3.

A rotor control circuit 113 whose details are shown in FIG. 4 includes pull-up resistors 129 and 130, current limiting resistors 133 to 137 and 143, transistors 131, 132 and 139 to 142, and an electrical power source 138.

When the potential at an inlet A reaches a high level, the transistor 142 turns on and, because of its base being connected through the resistor 136 to the collector of the tra 142, the transistor 132 also turns on. Because of its base being connected through the resistor 134 to the collector of the transistor 132, the transistor 139 then turns on. Therefore, the coil 19a printed on the rotor 19 is supplied with current flowing from the right to the left as viewed in FIG. 4.

Conversely when the potential at another inlet B reaches a high level, the transistors 141, 131 and 140 are turned on in sequence, whereby current flows through the coil 19a from the left to the right, or in the reversed direction.

Figure 5:
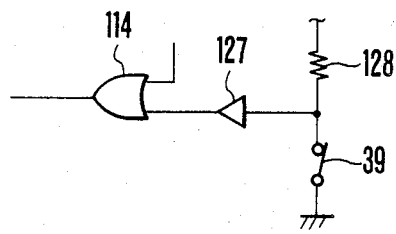
FIG. 5 is an electrical circuit diagram illustrating the details of the circuit for detecting the initial position of the lens barrel of FIG. 3.

Referring again to FIG. 3, the output of the counter 112 is applied to the AND gate 108 through a latch circuit 116, an inverter 115 and an OR gate 114 whose other input is connected to the output of a barrel position detecting circuit 117 having the aforesaid lens stop switch 39. The details of this circuit are shown in FIG. 5, where 128 is a pull-up resistor, and 127 is a buffer. When the barrel 2 is in the initial position, as the lens stop switch 39 is ON, an output of low level is given to the OR gate 114. As the barrel 2 moves forward, when the swich 39 turns off, the output changes to a high level. The output of the circuit 117 is applied to the AND gate 108 through the OR gate 114. The circuit of FIG. 3 further includes a first timer circuit responsive to output signal from the latch circuit 105 for starting counting, an exposure control circuit 119 having an input connected to the output of the first timer circuit 118 and having an output at which a signal appears after a time depending on the output of the photosensitive element 34, the signal being applied through an OR gate 120 and an inverter 121 to an AND gate 122, a second timer for producing an output representing the longest shutter time as measured from the production of the output of the first timer circuit 118, which output is connected to the other input of the OR gate 120, the other input of the AND gate 122 being connected to the output of the latch circuit 105, and a third timer circuit 125 having an input connected to the output of the OR gate 120 and having an output connected to the opposite input of the AND gate 108 to that connected to the output of the OR gate 114.

Figure 6:
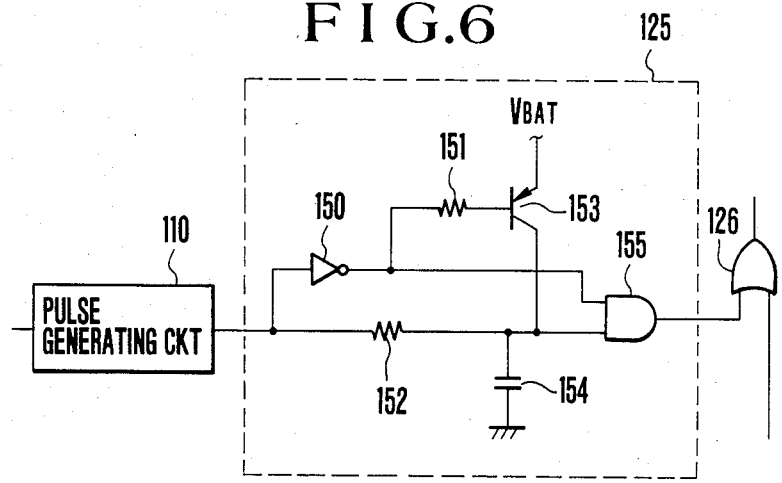
FIG. 6 is an electrical circuit diagram illustrating the details of the one-shot circuit of FIG. 3.

A one-shot circuit 125 has an input connected to the output of the pulse generating circuit 110 and, as shown in FIG. 6, includes an inverter gate 150, resistors 151 and 152, a transistor 153, a condenser 154, and an AND gate 155.

When the pulse generating circuit 110 produces an output of high level, the inverter gate 150 produces an output of low level which is then applied through the AND gate 155 and the current limiting resistor 151 to the transistor 153, whereby the condenser 154 is instantly charged to a high level.

Then, when the output of the pulse generating circuit 110 changes to low level, the condenser 154 starts to discharge at a rate determined by the time constant of the condenser 154 and the resistor 152. Therefore, the output of the AND gate 155 is changed to and maintained at a high level until the voltage on the condenser 154 falls below the threshold level of the input of the AND gate 155. As a result, in synchronism with the falling edge of each pulse from the circuit 110, the one-shot circuit 125 produces a pulse of duration determined by the resistor 152 and condenser 154 which pulse is applied to the coil 19a when the rotor 19 is returning back to the initial position. Thus, the stepwise movement of the barrel 2 is sped up. It should be noted that the output of the aforesaid AND gate 122 is applied along with the output of the one-shot circuit 125 to the rotor control circuit 113 through the OR gate 126.

The operation of the camera of such construction will next be described with reference to FIGS. 8A and 8B. When the release button is pushed to the first stroke, the first switch SW1 is closed, whereby all the circuit portions are supplied with a constant voltage Vcc from the power supply circuit 100. The sequencer 101 then produces a first actuating signal which is applied to the range finder circuit 102. The object distance is measured in terms of a number of ratchet wheel teeth and its value is stored on the register 103. Upon further depression of the release button to the second stroke, the switch SW2 is turned on, whereby the electrical power source is latched by the circuit 100 until the camera operation terminates, and the sequencer 101 produces a second actuating signal which is applied to the AND gate 107. Since, from the start point to now, the output of the latch circuit 105 is at a low level, as the inverter 104 is producing an output of high level, the output of the AND gate 107 responsive to the second actuating signal changes to a high level, and the output of the OR gate 109 changes from the low to the high level, whereby the pulse generating circuit 110 is rendered operative. Therefore, the circuit 110 starts to produce a train of pulses whose duration and period are previously determined to appropriate values to drive the barrel 2, in this instance, as shown in FIG. 8A, a pulse width of 10 msec. and an interval of 8 msec. between the successive two pulses. For every one pulse, the rotor 19 turns in the counterclockwise direction along with the drive lever 18 in engagement with the pin 19b. Such movement of the lever 18 is transmitted through the pin 18a- and-cutout 5a connection to upward movement of the reciprocating slide plate 5 along with the ratchet 9, which causes the distance adjusting ring 1 to rotate one tooth of the ratchet wheel 1b in the clockwise direction. Such movement of the ring 1 is transmitted by the cam lobe 1a to axially move the barrel 2 by one step forward. When the distance the ring 1 has rotated reaches a prescribed value, the pawl 12 enters the next root of the ratchet wheel to hold the ring 1 in a one-tooth advanced position.

In a time of 10 msec. or less, the first half of each cycle of rotor operation terminates. The second half of the cycle starts with the application of a negative going pulse whose duration is, for example, 3 msec. as shown in FIG. 8B, to the coil 19a. It should be noted here that determination of the value of the duration of this pulse is made based on the prerequisite that the rotor 19 can return to the initial position without relying on the force of the spring 8, but has not to overrun the initial position. Because the rotor 19 is turned back by itself, leaving the drive lever 18 behind, the driving power of the spring 8 acts only on the reciprocating slide plate 5, ratchet 9 and the drive lever 18, thereby giving an advantage of reducing the time necessary to carry out the second half of the cycle from the value which was heretofore possible as the minimum by a magnitude due to the removal of the weight of the rotor 19. It is also to be noted that as the second half of each cycle takes 8 msec. to complete, after the termination of duration of the negative going pulse, or 3 msec., no current is supplied to the coil 19a for 5 msec. Such procedure repeats itself a corresponding number of times to the measured value of the object distance, until the lens in the barrel 2 moves to an in-focus position.

Each negative going pulse is produced from the one-shot circuit 125 in synchronism with the falling edge of each of the pulses produced from the pulse generating circuit 110. The output of the pulse generating circuit 110 is also applied to the inverter gate 111 whose output is applied to the counter 112. Therefore, the counter 112 counts one pulse in synchronism with the falling edge of each driving pulse supplied to the coil 19a, thus storing the number of steps the barrel 2 has moved forward from the initial position.

Meanwhile, the comparator 106 compares the output of the counter 112 with the output of the register 103 upon coincidence in value or upon establishment of the in-focus condition to produce an output of high level. This output is latched by the latch circuit 105. The output of the latch circuit 105 is applied through the inverter gate 104 to the AND gate 107. Therefore, the output of the AND gate 107 changes to low level which is applied through the OR gate 109 to stop the operation of the pulse generating circuit 110. Thus, the automatic focusing operation of the barrel is terminated.

The output of the latch circuit 105 is also applied to the first timer and the AND gate 122 at one input thereof, the other input of which is supplied with the output of low level of the OR gate 120 after inverted to high level by the inverter gate 121. Responsive to change of the output of the latch circuit 105 to high level, the AND gate 122 produces an output of high level which is applied through the OR gate 126 to the second inlet B of the rotor control circuit 113. The rotor 19 is then turned in the clockwise direction from the initial position, while its pin 19c turning the shutter drive lever 22 in the counterclockwise direction with its pin 22c striking the latch lever 36. As the lever 36 turns in the counterclockwise direction, its nose 36a disengages from the extension 25c of the blade control lever 25. The lever 25 is then turned in the clockwise direction by the driving power of the spring 27, thereby the shutter blades 29 and 30 are opened, thus initiating an exposure.

Responsive to such change of the output of the latch circuit 105, the first timer 118 starts to count the time from the start of reverse current supply to the coil 19a to the start of an operation of the exposure control circuit 119. When the output of the first timer 118 changes to high level, the exposure control circuit 119 including the photosensitive element 34 starts to operate, and the second timer 123 also starts to count the longest allowable shutter time.

In a timing with whichever first the computed shutter time has passed or the preset longest shutter time has expired, the OR gate 120 changes its output to high level which after having changed to low level by the inverter gate 121 is applied to the AND gate 122, whereby the reverse current supply to the coil 19a is cut off. Then, the driving power of the spring 24 takes action on the control lever 25 thorough the pin 22c-and-arm 25b connection, closing the shutter blades 29 and 30. At the same time, the rotor 19 is pushed to the counterclockwise direction by the opposite arm 22a in engagement with the pin 19c to the initial position.

Responsive to such change of the output of the OR gate 120 to high level, the third timer 124 starts to count the time necessary for the blades 29 and 30 to move from the opening to the closing position. When this time has passed, the output of low level from the counter 112 is latched by the latch circuit 116, and the AND gate 108 changes its output to high level, since its other input is supplied with the output of low level from the latch circuit 116 after inverted to high level by the inverter gate 115 and passed through the OR gate 114. The output of the OR gate 109 then reaches a high level, whereby the pulse generating circuit 110 is rendered operative again. From this time onward, the lens barrel 2 is further moved forward. At the same time, the number of steps the barrel 2 has later moved is added to the number of steps the barrel 2 moved from the initial position to the infocus position by the counter 112. When the sum of these pulse numbers reaches a value representing that the barrel 2 has moved from the initial position by so long a distance as to insure that the stop switch 39 turns off, the counter 112 changes its output to a high level. The output of high level from the counter 112 is latched by the latch circuit 116. The output of high level from the latch circuit 116 is applied to the inverter gate 115 whose output of low level is applied to the OR gate 114 at one input thereof.

Since the other input of the OR gate 114 is supplied with the output of high level from the barrel position detecting circuit 117 because the lens stop switch 39 is off, the output of the OR gate 114 remains at a high level, continuing the driving of the barrel 2. When the cam lobe 1a on the distance adjusting ring 1 moves away from the cam follower pin 4 on the barrel 2, the barrel 2 is moved backward to the initial position by the spring 3, and the lens stop switch 39 is turned on. Responsive to this, the output of the barrel position detecting circuit 117 changes its output to a low level. Therefore, the OR gate 114 also changes its output to a low level, and the AND gate 108 and the OR gate 109 also change their outputs to a low level, whereby the operation of the pulse generating circuit 110 is stopped. Thus one cycle of camera operation is terminated with the barrel 2 in the initial position.

FIG. 7 is another example of the pulse generating circuit 110 and one-shot circuit 125 of FIG. 3 wherein the second actuating signal of high level from the OR gate 109 after having been inverted by an inverter 161 is applied to D type flip-flops 163 and 164 at their CLR terminals, whereby the D type flip-flops 163 and 164 are rendered operative. At the same time, an AND gate 162 is gated on to pass a train of clock pulses from a pulse generator 166 to the CLK terminal of the D type flip-flop 163 therethrough. In synchronism with the rising edge of the first pulse, its Q output changes to a high level. Responsive to this, the Q output of the second D type flip-flop 164 also changes to high level which is applied to the first inlet A of the rotor control circuit 113. Therefore, the coil 19a is supplied with current flowing in the normal direction. Since the $\bar{Q}$ output of the second D type flip-flop 164 is of a low level during the time when its Q output is at a high level, or when the normal current supply goes on, the potential at the second inlet B of the rotor control circuit 113 is maintained at a low level, preventing the reverse current supply from taking place.

When the third pulse enters the CLK terminal of the first D type flip-flop 163, the outputs of the second D type flip-flop 164 invert so that the potential at the first inlet A of the rotor control circuit 113 reaches a low level, terminating the normal current supply. At the same time, its $\bar{Q}$ output reaches a high level which is applied to an AND gate 165, and the Q output of the first D type flip-flop 163 also reaches a high level which is applied to the other input of the AND gate 165. Therefore, the AND gate 165 produces an output of high level which is then applied to the second inlet B of the rotor control circuit 113, starting a reverse current supply. This continues until the 4th pulse is produced from the AND gate 162 to change the Q output of the first D type flip-flop 163 to a low level. From the 5th pulse, a second cycle of rotor operation starts. In this example of FIG. 7, the width of the negative going pulse is made equal to ½ times that of the positive going pulse. It should, however, be pointed out that the ratio of the widths of these two pulses can be easily varied by using a commonly available logic circuit.

It will be appreciated from the foregoing that, according to the present invention, the barrel drive apparatus of the stepwise type having a rotor with a moving coil in a magnetic field and a ratchet mechanism for controlling the axial movement of a photographic lens barrel of a camera wherein the ratchet mechanism is driven by the driving power obtained by recycling the normal current supply to the coil when the rotor is in an initial position, and the distance the lens barrel moves axially is determined by the number of cycles of normal current supply, is provided with means for supplying current of the reversed direction to the aforesaid normal direction to the coil for a period equal to or shorter than the time necessary to return the rotor to the initial position by the only force of a spring when the ratchet mechanism is returning to the initial position, thereby giving an advantage that the load of the rotor on the return spring of the ratchet mechanism is either removed or reduced and, therefore, that an increase in the speed of returning movement of the ratchet mechanism can be achieved. This shortens the interval from the moment at which a camera release has been actuated to the moment at which the focusing operation of the barrel terminates. Thus, a camera of shorter shooting time lag than was heretofore possible can be realized.

While specific embodiments of the invention have been shown and described in detail to illustrate the application of the inventive principles, it will be understood that the invention may be embodied otherwise without departing from such principles.

We claim:

1. A drive device for an optical system in a camera, comprising:
   (A) an optical system variable in position;
   (B) drive means for changing in a stepwise manner the position of the optical system, said drive means shifting from an initial position in a predetermined direction by current passage therethrough in a first direction, returning to the initial position by current passage therethrough in a second direction, and repeating the shiftings so as to change in a stepwise manner the position of the optical system;

(C) control means for alternately performing the current passage in the first direction and the current passage in the second direction; and (D) elastic means for urging the drive means toward the initial position.

2. A drive device according to claim 1, wherein the optical system includes a photographic optical system.

3. A drive device according to claim 2, wherein the photographic optical system is adjusted in focal point in correspondence to the changed position.

4. A drive device according to claim 3, which further comprises distance measuring means for measuring the distance of an object and in which the control means determines the number of the current passage in response to the output of the distance measuring means so as to shift the photographic optical system to an in-focus position.

5. A drive device according to claim 4, wherein the control means includes exposure control means for performing current passage in the second direction after the shifting of the photographic optical system to the in-focus position, thereby performing an exposure.

6. A drive device according to claim 5, wherein the control means includes return means which performs again the alternate current passage in the first direction and in the second direction to the drive means after the completion of the exposure so as to return the photographic optical system to the initial position.

7. A drive device according to claim 6, wherein the photographic optical system includes switch means for disabling the operation of the return means in response to the returning of the photographic optical system to the initial position.

8. A drive device according to claim 1, wherein the control means includes timer means for making the time of the current passage in the second direction shorter than the time of the current passage in the first direction.

9. A drive device according to claim 1, wherein the drive means includes electromagnetic drive means for driving with electromagnetic force.

* * * * *